Patented May 5, 1931

1,804,054

UNITED STATES PATENT OFFICE

CARLE R. HAYWARD, OF QUINCY, MASSACHUSETTS

METHOD OF TREATING MATERIALS CONTAINING LEAD

No Drawing.     Application filed March 29, 1929.  Serial No. 351,128.

This invention relates to a method of smelting and refining materials, such as battery plate scrap or various drosses, which contain metallic lead and/or oxygen compounds of lead, with or without one or more other metals, as impurities or alloying constituents, such as antimony, arsenic or tin, or their oxides, as well as sulfur and copper.

The common method, heretofore employed for smelting such materials, requires an elevated temperature, usually causing considerable volatilization or slagging of valuable constituents which are either lost or recovered with difficulty.

I have found that by choosing a suitable flux it is possible to smelt materials containing one or more of the metals lead, tin and antimony at a temperature which need not exceed eight hundred degrees centigrade (800° C.). The process used causes only slight loss of these metals by either volatilization or slagging.

The lead, tin and antimony may be obtained either separately in a substantially pure form or in the form of useful alloys.

The flux is composed of a mixture of a halide such as fluorspar and an alkali metal compound or compounds which are substantially inert and remain unchanged by exposure to the atmosphere or by successive heating to the temperatures involved in the process, but reactive with the oxidized impurities of the metal to combine with and dissolve them from the charge as they are formed. Typically, a mixture of a halide and one or more oxygen salts of an alkali metal is found to be especially suitable.

Thus, in accordance with the present invention, if a considerable proportion of the lead is present in the form of an oxide or oxygen compound, the material may be first mixed with a reducing agent and with the alkali metal flux (characteristically a mixture of low melting point as above described) and the charge heated to a sufficient temperature to effect fusion of the whole mixture. The lead compounds are thereupon reduced to the free metal and the other metals are also liberated.

With or without separation from the attendant flux or slag, the metallic lead thus obtained, (or similar lead products obtained from any source such as battery plates mentioned above) typically containing one or more other metals as impurities, may now be treated with an additional quantity of the alkali metal flux, heated to a liquid condition, and then blown with an oxygen-containing gas, such as air or pure oxygen. The free metals which are present as impurities, except copper, are thereupon successively converted in the order of their chemical reactivities, into their respective oxides. These combine freely with the alkali metal of the flux and are dissolved thereby, leaving the purified melted lead which may be withdrawn.

The residual flux may now be reduced by heating with carbon to liberate the metals from their combined oxides, the free metal or metals accumulating and leaving the flux in a condition suitable for reuse.

As an example to illustrate the operation of the process, the treatment of scrap battery plates will be described.

A flux is prepared consisting of a mixture of alkali metal carbonate, borax or boracic acid and a fluoride such as fluorspar in such proportions that when fused the product is fluid below eight hundred degrees centigrade (800° C.). When sodium carbonate, borax and fluorspar are used in the ratio 10:3:3 the mixture is fluid at six hundred and fifty degrees centigrade (650° C.) and makes a satisfactory flux for treating battery plates and various other materials.

The battery plates, as received, are fused with the above flux and a suitable reducing agent. For example, satisfactory results are obtained by using the ingredients of the flux in various quantities and proportions but a preferred mixture is two hundred (200) pounds of sodium carbonate, sixty (60) pounds of borax, sixty (60) pounds of fluorspar and seventy-five (75) pounds of bituminous coal for each ton (2000 pounds) of battery plates. The fusion may be conducted successfully in a cast iron pot or in a reverberatory type furnace, with a hearth lined with magnesite brick, for example, but the type of vessel used for the fusion forms no part of this invention.

The fusion of the battery plates and flux produces a metal containing substantially all the lead and antimony and a slag containing most of the sulfur and copper and only traces of lead and antimony. The slag may be re-used one or more times with more reducing agent with or without additional new flux for treating further charges of battery plates.

The metal resulting from the preliminary fusion may be marketed direct or the antimony may be removed by any suitable method. For this purpose, the antimony may be removed by the following treatment. The molten metal is kept at a temperature above the melting point of the flux and air is blown through the metal. This causes the antimony to oxidize and be transferred from the metal to the flux. A cast iron pot is suitable as a container, and the flux is preferably of the same composition as that used for smelting but without the reducing agent. The air is introduced by inserting an iron pipe into the metal, and connecting it with a suitable supply of compressed air or oxygen. The antimony is oxidized, and in this form combines with the fluxing material. It is obvious that many variations from this procedure are possible.

The products from the treatment for removing the antimony are soft lead containing only traces of antimony and a slag containing the antimony and usually small amounts of lead. The soft lead is ready for market. The slag may be mixed with reducing agent, such as bituminous coal, and fused. This causes the reduction of the antimony and lead contained in the slag and its recovery as a lead-antimony alloy.

The slag from the fusion to reduce the antimony is still suitable for use in the first operation whereby the original battery plates were smelted. This possibility of re-using the flux makes the removal of antimony simple and inexpensive.

The smelting of scrap battery plates and the removal of antimony has been used as an example but the same procedure may be used for treating lead and tin-bearing materials. In this case, a lead-tin alloy is obtained by the first smelting operation and the tin may then be removed from the lead in a manner similar to that used in removing the antimony from lead. The tin and lead taken up by the flux may be recovered by fusing the slag with a reducing agent and the flux is then available for re-use in the first operation.

Materials containing lead, tin and antimony may be fused with the flux and reducing agent in the same manner as that described for battery plates to produce a lead-tin-antimony alloy. By successive additions of flux accompanied by blowing the metal with air as in the removal of antimony from lead most of the tin is first removed from the alloy accompanied by small amounts of lead and antimony after which the remaining antimony may be removed (by treatment with a fresh charge of flux), accompanied by small amounts of lead and tin. The products from this treatment are substantially pure lead and a series of slags which after fusing with reducing agent will give a series of alloys with varying amounts of lead, antimony and tin. The slag from these fusions is available for re-use in the first smelting operation.

If arsenic is present in the metals treated by blowing in the presence of the flux it will be taken up by the flux. The process is also applicable to tin drosses, where lead is negligible or absent, by a like manner of procedure.

I claim:

1. A method of treating lead containing an oxide or oxides of lead, arsenic, tin or antimony, comprising the step of heating the same above the melting point in the presence of a reducing agent and a flux containing stable oxygen salts of an alkali metal and a fluoride.

2. A method of treating lead containing an oxide or oxides of lead, arsenic, tin or antimony, comprising the step of heating the same above the melting point in the presence of a reducing agent and a flux containing a carbonate and borate of an alkali metal and a fluoride.

3. A method of treating lead containing an oxide or oxides of lead, arsenic, tin or antimony, comprising the step of heating the same above the melting point in the presence of a reducing agent and a flux containing sodium carbonate, borax and fluorspar.

4. A method of treating lead containing an oxide or oxides of lead, arsenic, tin or antimony, comprising the step of heating the same above the melting point in the presence of a reducing agent and a flux containing sodium carbonate, borax and fluorspar in the proportions of 10:3:3, by weight.

5. A method of treating lead containing an oxide or oxides of lead, arsenic, tin or antimony, comprising the steps of heating the same above the melting point in the presence of a reducing agent and a flux, and thereafter blowing the charge of reduced metal with an oxygen containing gas in the presence of a flux containing stable oxygen salts of an alkali metal and a fluoride.

6. A method of treating lead containing an oxide or oxides of lead, arsenic, tin or antimony, comprising the steps of heating the same above the melting point in the presence of a reducing agent and a flux, and thereafter blowing the charge of reduced metal with an oxygen containing gas in the presence of a flux containing a carbonate and borate of an alkali metal and a fluoride.

7. A method of treating lead containing an oxide or oxides of lead, arsenic, tin or antimony, comprising the steps of heating the same above the melting point in the presence of a reducing agent and a flux, and thereafter blowing the charge of reduced metal with an oxygen containing gas in the presence of a flux containing sodium carbonate, borax and fluorspar.

8. A method of treating lead containing an oxide or oxides of lead, arsenic, tin or antimony, comprising the steps of heating the same above the melting point in the presence of a reducing agent and a flux, and thereafter blowing the charge of reduced metal with an oxygen containing gas in the presence of a flux containing sodium carbonate, borax and fluorspar in the proportions of 10:3:3, parts by weight.

9. A method of treating lead containing arsenic, tin or antimony, comprising the steps of subjecting the charge to oxidation, preferentially to oxidize the metallic impurities, and heating the same above the melting temperature in the presence of a flux containing a stable oxygen salt of an alkali metal and a fluoride.

10. A method of treating lead containing arsenic, tin or antimony, comprising the steps of subjecting the charge to oxidation, preferentially to oxidize the metallic impurities, and heating the same above the melting temperature in the presence of a flux containing a carbonate and borate of an alkali metal and a fluoride.

11. A method of treating lead containing arsenic, tin or antimony, comprising the steps of subjecting the charge to oxidation, preferentially to oxidize the metallic impurities, and heating the same above the melting temperature in the presence of a flux containing sodium carbonate, borax and fluorspar.

12. A method of treating lead containing arsenic, tin or antimony, comprising the steps of subjecting the charge to oxidation, preferentially to oxidize the metallic impurities and heating the same above the melting temperature in the presence of a flux containing sodium carbonate, borax and fluorspar in the proportions 10:3:3, by weight.

13. A method of treating lead containing arsenic, tin or antimony, comprising the steps of subjecting the charge to oxidation, preferentially to oxidize the metallic impurities, and heating the same above the melting temperature in the presence of a flux containing stable oxygen salts of an alkali metal and a fluoride and repeating said steps with intermediate separation of the previous flux and addition of a fresh flux, successively to remove the arsenic, tin and antimony.

14. A fluxing composition comprising a carbonate and a borate of an alkali metal and a fluoride.

15. A fluxing composition comprising sodium carbonate, borax and fluorspar.

16. A fluxing composition comprising sodium carbonate, borax and fluorspar in the proportion 10:3:3, by weight.

17. A fluxing composition comprising a mixture of carbonates and borates of alkaline metals together with fluorides in such proportions that the mixture will fuse below 650 degrees centigrade.

Signed by me at Cambridge, Massachusetts, this Twenty-sixth day of March, 1929.
CARLE R. HAYWARD.